(12) United States Patent
Kulp et al.

(10) Patent No.: US 8,870,251 B1
(45) Date of Patent: Oct. 28, 2014

(54) QUICK HITCH SYSTEM AND METHODS FOR TRUCK MOUNTED CRASH ATTENUATOR

(71) Applicant: TrafFix Devices, Inc., San Clemente, CA (US)

(72) Inventors: Jack H. Kulp, Dana Point, CA (US); Felipe Almanza, Perris, CA (US); Geoffrey B. Maus, Mission Viejo, CA (US); Jeremy Smith, San Clemente, CA (US)

(73) Assignee: TrafFix Devices, Inc., San Clemente, CA (US)

( * ) Notice: Subject to any disclaimer, the term of this patent is extended or adjusted under 35 U.S.C. 154(b) by 0 days.

(21) Appl. No.: 13/755,564

(22) Filed: Jan. 31, 2013

Related U.S. Application Data

(60) Provisional application No. 61/593,211, filed on Jan. 31, 2012.

(51) Int. Cl.
*B60R 19/56* (2006.01)
*B60R 19/02* (2006.01)

(52) U.S. Cl.
CPC .................................... *B60R 19/023* (2013.01)
USPC .......................................... 293/133; 188/377

(58) Field of Classification Search
USPC .............. 293/133; 188/377; 256/13.1; 404/6
See application file for complete search history.

(56) References Cited

U.S. PATENT DOCUMENTS

| | | | |
|---|---|---|---|
| 5,052,732 A * | 10/1991 | Oplet et al. | 293/102 |
| 6,581,992 B1 | 6/2003 | Gertz | |
| 7,438,337 B1 | 10/2008 | Gertz | |
| 7,841,110 B2 | 11/2010 | Koch et al. | |
| 8,276,956 B2 * | 10/2012 | Maus | 293/133 |
| 2004/0251698 A1 * | 12/2004 | Welch et al. | 293/133 |
| 2012/0074721 A1 * | 3/2012 | LaTurner et al. | 293/133 |

* cited by examiner

*Primary Examiner* — Lori Lyjak
(74) *Attorney, Agent, or Firm* — Donald E. Stout; Stout, Uxa & Buyan, LLP

(57) ABSTRACT

A system for joining a crash attenuator to a vehicle is operated by moving the crash attenuator into a joining position directly behind the vehicle and dropping a pair of hooks extending from an upper end of one of the vehicle and the crash attenuator over an engagement pin disposed on an upper end of the other of the vehicle and the crash attenuator, so that the hook and the engagement pin are engaged. Two sets of holes disposed on lower ends of each of the vehicle and the crash attenuator are aligned, and a securing pin is inserted through each set of aligned holes, for redundancy.

17 Claims, 2 Drawing Sheets

QUICK HITCH SYSTEM AND METHODS FOR TRUCK MOUNTED CRASH ATTENUATOR

This application claims the benefit under 35 U.S.C. 119(e) of the filing date of Provisional U.S. Application Ser. No. 61/593,211, entitled Quick Hitch System for Truck Mounted Crash Attenuator, filed on Jan. 31, 2012, which is commonly assigned and herein expressly incorporated by reference, in its entirety.

BACKGROUND OF THE INVENTION

This invention relates to attenuators which are particularly adapted for the absorption of energy in the event of an impact between an errant vehicle and a second, typically stationary or slow-moving vehicle, in the hope of minimizing injury to the occupants of both vehicles, and, more specifically, to truck-mounted crash attenuators.

SUMMARY OF THE INVENTION

The present invention provides a quick-hitch system for conveniently and quickly attaching a truck mounted attenuator (TMA), such as the TMA disclosed in commonly-owned U.S. Pat. No. 6,581,992, which patent is herein expressly incorporated by reference, in its entirety.

More particularly, there is provided a hitch system for securing a second structure to a first structure, which comprises a first assembly mountable to the first structure. In a disclosed embodiment, the first structure is a vehicle, such as a truck, and the second structure is a crash attenuator to be mounted to a rear end of the vehicle. The first assembly comprises a plate attachable to the first structure in a substantially vertical orientation. A first side mount is attached to the plate in an orientation substantially orthogonal to the plate, so that it is substantially vertically oriented. A second side mount is attached to the plate at a location on an opposed planar end of the plate relative to the location of the first side mount, in an orientation substantially orthogonal to the plate, so that it is substantially vertically oriented and substantially parallel to the first side mount. A first pin extends substantially horizontally from an upper end of the first side mount toward the second side mount. A second pin extends substantially horizontally from an upper end of the second side mount toward the first side mount. A hole is disposed in the lower end of each of the first and second side mounts.

The hitch system also comprises a second assembly mountable to the second structure. The second assembly comprises a plate attachable to the second structure in a substantially vertical orientation, and a first second assembly side mount attached to the second assembly plate in an orientation substantially orthogonal to the second assembly plate so that it is substantially vertically oriented. A second second assembly side mount is attached to the second assembly plate at a location on an opposed planar end of the second assembly plate relative to the location of the first second assembly side mount, in an orientation substantially orthogonal to the second assembly plate so that it is substantially vertically oriented and substantially parallel to the first second assembly side mount. A first hook is disposed on an upper end of the first second assembly side mount and a second hook is disposed on an upper end of the second second assembly side mount. The second assembly further comprises a hole disposed in a lower end of each of the first and second second assembly side mounts.

When the first and second assemblies are engaged, to secure the second structure to the first structure, each of the first and second hooks are engaged with corresponding ones of each of the first and second pins to secure upper ends of the first and second assemblies together. Additionally, for redundancy, corresponding aligned holes of each of the first and second assemblies are joined together with a keeper pin to secure lower ends of the first and second assemblies together.

When the first structure is a vehicle, and the second structure is a crash attenuator, the first assembly is a vehicle side assembly and may further comprise a first inner mount attached to the plate in an orientation substantially orthogonal to the plate so that it is substantially vertically oriented. The first inner mount is substantially parallel to the first side mount and is spaced therefrom in a direction toward the second side mount, so that the first pin extends between the first side mount and the first inner mount. The vehicle side assembly also comprises a second inner mount attached to the plate in an orientation substantially orthogonal to the plate so that it is substantially vertically oriented. This second inner mount is substantially parallel to the second side mount and spaced therefrom in a direction toward the first side mount, so that the second pin extends between the second side mount and the second inner mount.

A retaining tube is aligned with and extends outwardly from the hole in each of the first and second side mounts of the vehicle side assembly. Each of the retaining tubes is adapted for receiving and retaining one of the keeper pins.

In another aspect of the invention, there is provided a hitch system for securing a truck mounted crash attenuator to a truck. This hitch system comprises a truck side assembly mountable to a truck, which comprises a plate attachable to the truck in a substantially vertical orientation. The truck side assembly further comprises a first side mount attached to the plate in an orientation substantially orthogonal to the plate so that it is substantially vertically oriented, as well as a second side mount attached to the plate at a location on an opposed planar end of the plate relative to the location of the first side mount, in an orientation substantially orthogonal to the plate so that it is substantially vertically oriented and substantially parallel to the first side mount. An attenuator side assembly is mountable to a crash attenuator, wherein the attenuator side assembly comprises a plate attachable to the crash attenuator in a substantially vertical orientation. A first attenuator side assembly side mount is attached to the attenuator side assembly plate in an orientation substantially orthogonal to the attenuator side assembly plate so that it is substantially vertically oriented. A second attenuator side assembly side mount is attached to the attenuator side assembly plate at a location on an opposed planar end of the attenuator side assembly plate relative to the location of the first attenuator side assembly side mount, in an orientation substantially orthogonal to the attenuator side assembly plate so that it is substantially vertically oriented and substantially parallel to the first attenuator side assembly side mount.

In this hitching system, each of the first and second side mounts on the truck side assembly and each of the first and second attenuator side assembly side mounts on the attenuator side assembly advantageously include engagement mechanisms on both upper and lower ends thereof, so that when the truck side assembly and the attenuator side assembly are joined to secure the truck mounted crash attenuator to a truck, the truck side assembly and the attenuator side assembly are attached together at both upper and lower locations for redundancy. More particularly, when the hitch system is connected, the truck side assembly and the attenuator side assembly are attached together at at least two upper locations, one on each side of the connected hitch system, and at at least two lower locations, one on each side of the connected hitch system. In an illustrated embodiment, the engagement mechanisms on each upper location comprise a hook disposed on the upper end of each of the first and second side mounts on one of the truck side assembly and the attenuator side assembly and a pin disposed on the upper end of each of the first and second side mounts on the other of the truck side assembly and the attenuator side assembly, so that when the engagement mechanisms are joined, the hook is disposed over the pin at each location. The engagement mechanisms on each lower location comprise a hole disposed through each side mount of both side assemblies, at lower ends thereof, so that when the side assemblies are joined, corresponding holes in the side mounts of each side assembly are aligned, the lower engagement mechanisms further comprising a pin for insertion through the aligned holes. As illustrated, though not required, the hooks are disposed on the attenuator side assembly and the pins are disposed on the truck side assembly.

In still another aspect of the invention, there is disclosed a method of joining a crash attenuator to a vehicle. The method comprises moving the crash attenuator into a joining position directly behind the vehicle and dropping a hook extending from one of the vehicle and the crash attenuator over an engagement pin disposed on the other of the vehicle and the crash attenuator, so that the hook and the engagement pin are engaged. Holes disposed on each of the vehicle and the crash attenuator are aligned, and a securing pin is inserted through the aligned holes.

For the dropping step, the hook comprises a pair of hooks, disposed on generally opposed sides of the vehicle or crash attenuator, on an upper end thereof. Additionally, for the dropping step, the engagement pin comprises a pair of engagement pins, disposed on generally opposed sides of the vehicle or crash attenuator, on an upper end thereof. In an illustrated embodiment, though by no means required, the hooks are disposed on the crash attenuator and the engagement pins are disposed on the vehicle. The holes aligned during the aligning step are disposed at a location substantially lower than the location of the hook and the engagement pin.

The aligning step comprises aligning a set of holes on one side of each of the vehicle and the crash attenuator and also aligning a set of holes on the other side of each of the vehicle and the crash attenuator. The inserting step comprises inserting a securing pin through each set of aligned holes. A further step involves inserting a keeper through the securing pin to prevent unintentional removal of the securing pin from the aligned holes.

The invention may best be understood by reference to the following description taken in conjunction with the accompanying illustrative drawings.

DESCRIPTION OF THE DRAWINGS

Referring now to the drawings.

Figure 1:
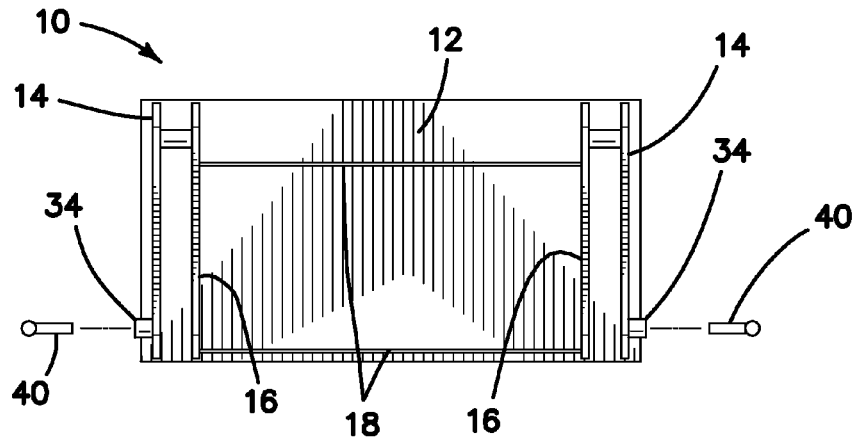
FIGS. 1-3 show the portion of the quick hitch system of the present invention which is mounted to the truck or other vehicle.
Figure 2:
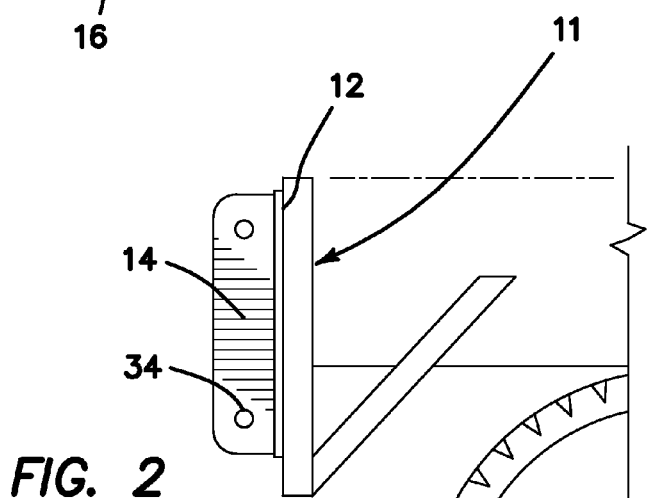
Figure 3:
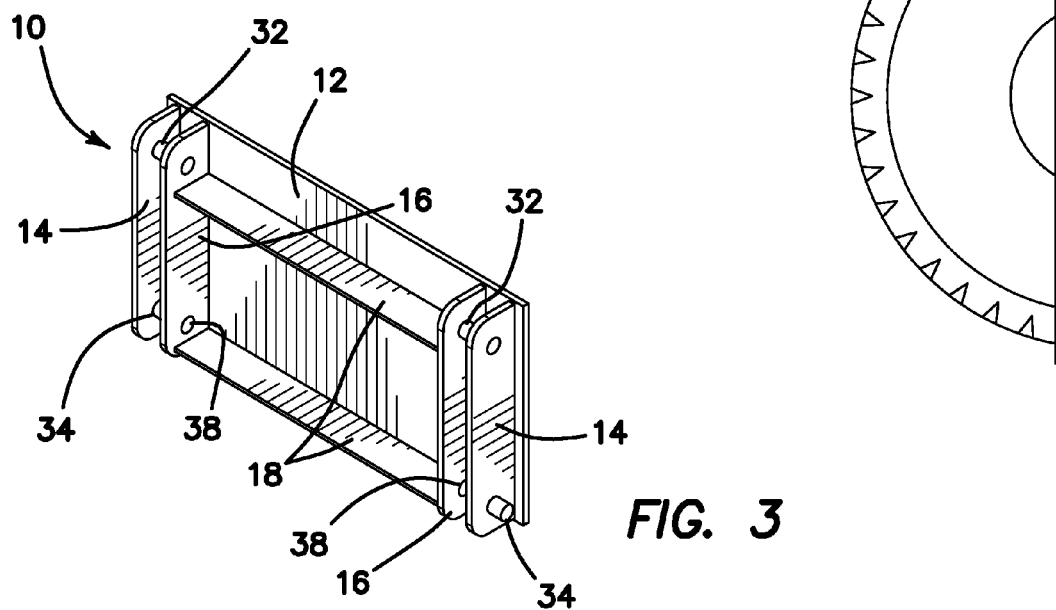

As can be seen from FIGS. 1-3, the truck side assembly 10 (that which is secured to a truck 11, or more broadly, vehicle or first structure) comprises a truck side plate 12, and a truck side mount 14 attached to the plate 12. An inner mount 16 is secured to the plate 12, inside of the mount 14. Ribs 18 are disposed between the opposing portions forming the inner mount 16.

Figure 4:
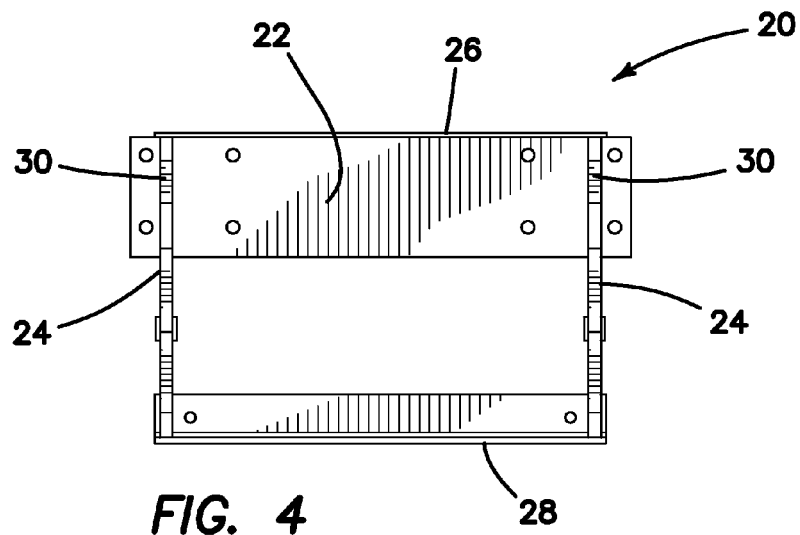
FIGS. 4-6 show the portion of the quick hitch system of the present invention which is mounted to the TMA. The TMA may be constructed in accordance with the disclosure of the '992 patent, and is not further shown herein. Other suitable TMA's may be used with the disclosed quick hitch system. Even more broadly, the disclosed quick hitch system may be used in many different circumstances where the objective is to secure a first structure to a second structure.
Figure 5:
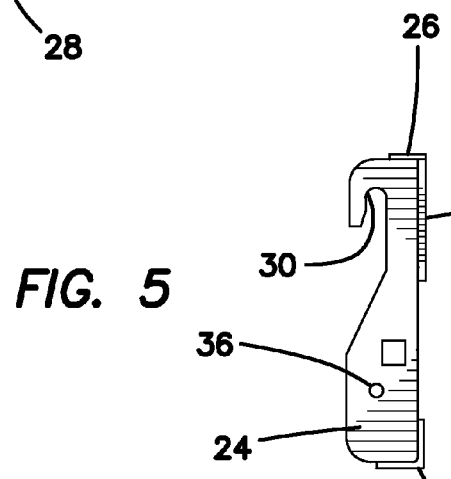
Figure 6:
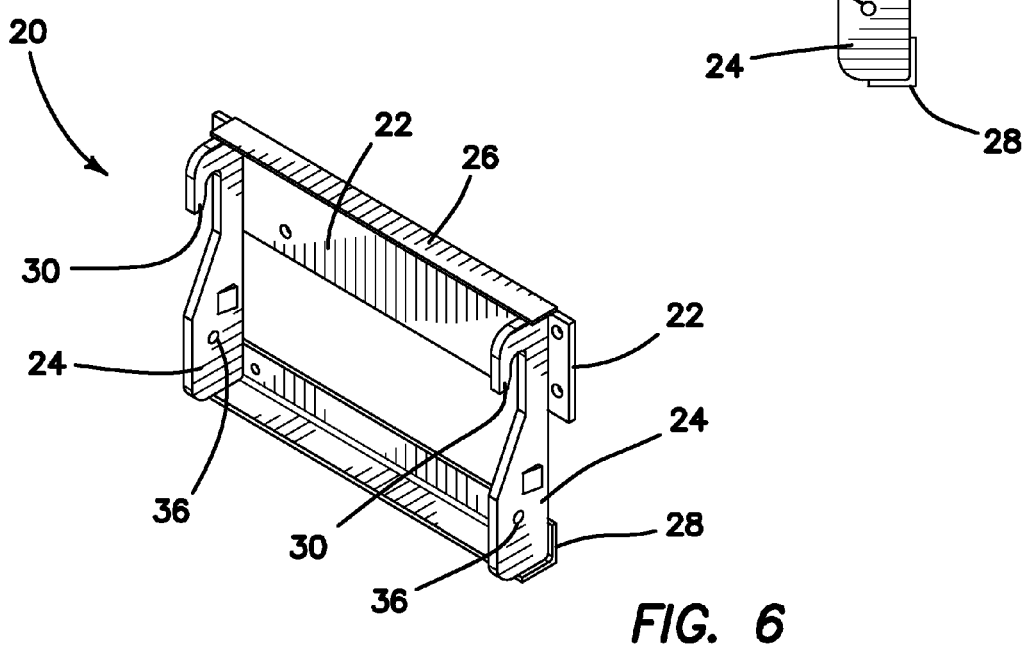

FIGS. 4-6 illustrate the TMA side assembly 20 (that which is secured to the TMA, or more broadly, second structure). The TMA side assembly 20 comprises a TMA side plate 22 having a TMA side mount 24, a top bar or cap 26, and a lower angle 28.

In operation, the truck side plate 12 is secured to the truck 11 or first structure, in a flush-mounting manner, using suitable hardware, such as nuts and bolts. Similarly, the TMA side plate 22 is secured to the TMA or second structure, in a flush-mounting manner, using suitable hardware, such as nuts and bolts. They can alternatively be welded, if desired. Then, when it is desired to attach the TMA to the truck 11, using the inventive hitching system, the TMA side assembly 20 is engaged with the truck side assembly 10 by disposing the hooks 30 on the TMA side mounts 24 over the pins 32 on the truck side mount 14, so that the hooks 30 and their associated respective side mounts 24 are disposed between respective side mounts 14 and inner mounts 16 on each side of the truck side plate 22. Once the hooks 30 are engaged with respective pins 32, gravity causes the hooks to come down over the pins, so that the pins rest at the base of their corresponding hook, thereby causing the TMA side assembly to be supported by the truck side assembly. At this point, a retaining tube 34 on each truck side mount 14 is aligned with a corresponding keeper hole 36 in its corresponding TMA side mount 24, which, in turn, is aligned with a corresponding keeper hole 38 in the truck side inner mount 16. Once alignment of these three holes is achieved, a keeper pin 40 (FIG. 1) is inserted lengthwise through the retaining tube 34 and through all three aligned holes and secured in place, on one side of the assembled hitching system, after which a second keeper pin 40 is inserted lengthwise through the retaining tube 34 and through all three aligned holes and secured in place, on the opposed side of the system. The keeper pins 40 ensure the continued securement of the TMA side assembly to the truck side assembly until the keeper pins 40 are removed. Each of the retaining tubes 40 include a cotter pin hole 42 (FIG. 3), through which a cotter pin (not shown) on each keeper pin 40 is inserted. This ensures that the keeper pins 40, once installed, are not unintentionally removed.

What is claimed is:

1. A hitch system for securing a second structure to a first structure, comprising:

a first assembly mountable to the first structure, the first assembly comprising a plate attachable to the first structure in a substantially vertical orientation, a first side mount attached to said plate in an orientation substantially orthogonal to said plate so that the first side mount is substantially vertically oriented, a second side mount attached to said plate at a location on an opposed planar end of the plate relative to the location of the first side mount, in an orientation substantially orthogonal to said plate so that the second side mount is substantially vertically oriented and substantially parallel to the first side mount, a first pin extending substantially horizontally from an upper end of the first side mount toward the second side mount, a second pin extending substantially horizontally from an upper end of the second side mount toward the first side mount, and a hole disposed in the lower end of each of the first and second side mounts;

a second assembly mountable to the second structure, the second assembly comprising a plate attachable to the second structure in a substantially vertical orientation, a first second assembly side mount attached to said second assembly plate in an orientation substantially orthogonal to said second assembly plate so that the first second assembly side mount is substantially vertically oriented, a second second assembly side mount attached to said second assembly plate at a location on an opposed planar end of the second assembly plate relative to the location of the first second assembly side mount, in an orientation substantially orthogonal to said second assembly plate so that the second second assembly side mount is substantially vertically oriented and substantially parallel to the first second assembly side mount, a first hook disposed on an upper end of said first second assembly side mount and a second hook disposed on an upper end of said second second assembly side mount, said second assembly further comprising a hole disposed in a lower end of each of said first and second second assembly side mounts;

wherein when said first and second assemblies are engaged, to secure the second structure to the first structure, each of said first and second hooks are engaged with corresponding ones of each of said first and second pins to secure upper ends of the first and second assemblies together, and corresponding aligned holes of each of the first and second assemblies are joined together with a keeper pin to secure lower ends of the first and second assemblies together.

2. The hitch system as recited in claim 1, wherein the first structure comprises a vehicle and the second structure comprises a crash attenuator to be mounted to said vehicle.

3. The hitch system as recited in claim 2, wherein said first assembly is a vehicle side assembly and further comprises a first inner mount attached to said plate in an orientation substantially orthogonal to said plate so that the first inner mount is substantially vertically oriented, substantially parallel to said first side mount and spaced therefrom in a direction toward said second side mount, so that the first pin extends between said first side mount and said first inner mount, said vehicle side assembly also comprising a second inner mount attached to said plate in an orientation substantially orthogonal to said plate so that the second inner mount is substantially vertically oriented, substantially parallel to said second side mount and spaced therefrom in a direction toward said first side mount, so that the second pin extends between said second side mount and said second inner mount.

4. The hitch system as recited in claim 3, and further comprising a retaining tube aligned with and extending outwardly from the hole in each of the first and second side mounts of the vehicle side assembly, each of the retaining tubes being adapted for receiving and retaining one of said keeper pins.

5. A hitch system for securing a truck mounted crash attenuator to a truck, comprising:
a truck side assembly mountable to a truck, comprising a plate attachable to the truck in a substantially vertical orientation, a first side mount attached to said plate in an orientation substantially orthogonal to the plate so that the first side mount is substantially vertically oriented, a second side mount attached to the plate at a location on an opposed planar end of the plate relative to the location of the first side mount, in an orientation substantially orthogonal to the plate so that the second side mount is substantially vertically oriented and substantially parallel to the first side mount; and an attenuator side assembly mountable to a crash attenuator, the attenuator side assembly comprising a plate attachable to the crash attenuator in a substantially vertical orientation, a first attenuator side assembly side mount attached to the attenuator side assembly plate in an orientation substantially orthogonal to the attenuator side assembly plate so that the first attenuator side assembly side mount is substantially vertically oriented, a second attenuator side assembly side mount attached to the attenuator side assembly plate at a location on an opposed planar end of the attenuator side assembly plate relative to the location of the first attenuator side assembly side mount, in an orientation substantially orthogonal to the attenuator side assembly plate so that the second attenuator side assembly side mount is substantially vertically oriented and substantially parallel to the first attenuator side assembly side mount;

wherein each of the first and second side mounts on the truck side assembly and each of the first and second attenuator side assembly side mounts on the attenuator side assembly include engagement mechanisms on both upper and lower ends thereof, so that when the truck side assembly and the attenuator side assembly are joined to secure the truck mounted crash attenuator to a truck, the truck side assembly and the attenuator side assembly are attached together at both upper and lower locations for redundancy.

6. The hitch system as recited in claim 5, wherein when the hitch system is connected, the truck side assembly and the attenuator side assembly are attached together at at least two upper locations, one on each side of the connected hitch system, and at at least two lower locations, one on each side of the connected hitch system.

7. The hitch system as recited in claim 6, wherein the engagement mechanisms on each upper location comprise a hook disposed on the upper end of each of the first and second side mounts on one of the truck side assembly and the attenuator side assembly and a pin disposed on the upper end of each of the first and second side mounts on the other of the truck side assembly and the attenuator side assembly, so that when the engagement mechanisms are joined, the hook is disposed over the pin at each location.

8. The hitch system as recited in claim 7, wherein the engagement mechanisms on each lower location comprise a hole disposed through each side mount of both side assemblies, at lower ends thereof, so that when the side assemblies are joined, corresponding holes in the side mounts of each side assembly are aligned, the lower engagement mechanisms further comprising a pin for insertion through the aligned holes.

9. The hitch system as recited in claim 7, wherein the hooks are disposed on the attenuator side assembly and the pins are disposed on the truck side assembly.

10. A method of joining a crash attenuator to a vehicle, comprising:
moving the crash attenuator into a joining position directly behind the vehicle;
dropping a hook extending from one of the vehicle and the crash attenuator over an engagement pin disposed on the other of the vehicle and the crash attenuator, so that the hook and the engagement pin are engaged;
aligning holes disposed on each of the vehicle and the crash attenuator; and
inserting a securing pin through the aligned holes.

11. The method as recited in claim 10, wherein for the dropping step, the hook comprises a pair of hooks, disposed on generally opposed sides of the vehicle or crash attenuator, on an upper end thereof.

12. The method as recited in claim 11, wherein for the dropping step, the engagement pin comprises a pair of engagement pins, disposed on generally opposed sides of the vehicle or crash attenuator, on an upper end thereof.

13. The method as recited in claim 12, wherein the hooks are disposed on the crash attenuator and the engagement pins are disposed on the vehicle.

14. The method as recited in claim 10, wherein the holes aligned during the aligning step are disposed at a location substantially lower than the location of the hook and the engagement pin.

15. The method as recited in claim 14, wherein the aligning step comprises aligning a set of holes on one side of each of the vehicle and the crash attenuator and also aligning a set of holes on the other side of each of the vehicle and the crash attenuator.

16. The method as recited in claim 15, wherein the inserting step comprises inserting a securing pin through each set of aligned holes.

17. The method as recited in claim 16, and further comprising a step of inserting a keeper through the securing pin to prevent unintentional removal of the securing pin from the aligned holes.

* * * * *